US012166395B2

(12) United States Patent
Lee

(10) Patent No.: US 12,166,395 B2
(45) Date of Patent: Dec. 10, 2024

(54) MOTOR

(71) Applicant: LG INNOTEK CO., LTD., Seoul (KR)

(72) Inventor: Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 151 days.

(21) Appl. No.: 17/757,336

(22) PCT Filed: Nov. 3, 2020

(86) PCT No.: PCT/KR2020/015221
§ 371 (c)(1),
(2) Date: Jun. 14, 2022

(87) PCT Pub. No.: WO2021/125549
PCT Pub. Date: Jun. 24, 2021

(65) Prior Publication Data
US 2023/0036262 A1    Feb. 2, 2023

(30) Foreign Application Priority Data
Dec. 18, 2019    (KR) .................. 10-2019-0169846

(51) Int. Cl.
*H02K 3/34*    (2006.01)
*H02K 3/32*    (2006.01)
(Continued)

(52) U.S. Cl.
CPC ............... *H02K 3/522* (2013.01); *B62D 5/04* (2013.01); *H02K 2203/12* (2013.01)

(58) Field of Classification Search
CPC .......... H02K 3/522; H02K 3/521; H02K 3/52; H02K 3/34; H02K 3/345; H02K 3/30;
(Continued)

(56) References Cited

U.S. PATENT DOCUMENTS 9,209,658 B2 * 12/2015 Haga ........................ H02K 3/18
9,954,407 B2 *  4/2018 Foulsham .............. H02K 3/345
(Continued)

FOREIGN PATENT DOCUMENTS

EP     1 923 977 A1    5/2008
FR       3053179 A1 * 12/2017 ............. H02K 3/345
(Continued)

OTHER PUBLICATIONS

Supplementary European Search Report dated Jan. 9, 2023 in European Application No. 20900816.8.
(Continued)

*Primary Examiner* — Edgardo San Martin
(74) *Attorney, Agent, or Firm* — Saliwanchik, Lloyd & Eisenschenk

(57) ABSTRACT

An embodiment provides a motor comprising: a stator; a rotor provided inside the stator; and a shaft coupled to the rotor, wherein the stator comprises a stator core, a coil wound around the stator coil, and an insulator provided between the stator core and the coil. The insulator comprises an upper insulator and a lower insulator, wherein an upper body of the upper insulator comprises: a first side wall portion; a second side wall portion provided spaced apart from the first side wall portion; and a first cover portion extending from an end portion of the first side wall portion and connected to an end portion of one side of the second side wall portion, wherein the number of a plurality of first grooves formed in the first side wall portion is different from the number of a plurality of second grooves formed in the second side wall portion. Accordingly, when a coil having an increased diameter is used, asymmetrical winding of the coil is realized using an insulator which guides placement of the coil, and thus performance of the motor can be improved.

14 Claims, 12 Drawing Sheets

(51) Int. Cl.
*H02K 3/46* (2006.01)
*H02K 3/52* (2006.01)
*B62D 5/04* (2006.01)

(58) Field of Classification Search
CPC ............ H02K 3/32; H02K 3/325; H02K 3/46;
H02K 3/48; H02K 1/04; H02K 1/14;
H02K 1/16; H02K 2203/12; H02K
2213/03
See application file for complete search history.

(56) References Cited

U.S. PATENT DOCUMENTS

| | | | | |
|---|---|---|---|---|
| 10,014,741 | B2* | 7/2018 | Lee | H02K 3/18 |
| 10,923,979 | B2* | 2/2021 | Lee | H02K 3/345 |
| 11,336,141 | B2* | 5/2022 | Watanabe | H02K 3/325 |
| 11,496,012 | B2* | 11/2022 | Kim | H02K 3/345 |
| 11,909,287 | B2* | 2/2024 | Kim | H02K 3/522 |
| 2014/0363320 | A1 | 12/2014 | Hayakawa et al. | |
| 2021/0320540 | A1* | 10/2021 | Kim | H02K 1/18 |
| 2021/0320547 | A1* | 10/2021 | Kim | H02K 3/325 |
| 2022/0094213 | A1* | 3/2022 | Shin | H02K 3/325 |
| 2022/0337115 | A1* | 10/2022 | Kim | H02K 3/12 |

FOREIGN PATENT DOCUMENTS

| | | | | |
|---|---|---|---|---|
| JP | 2004-350450 A | | 12/2004 | |
| JP | 2006-67778 A | | 3/2006 | |
| JP | 2007267492 A | * | 10/2007 | |
| JP | 2013-21904 A | | 1/2013 | |
| JP | 2014103712 A | * | 6/2014 | |
| JP | 2015139243 A | * | 7/2015 | ............... H02K 3/18 |
| JP | 2021100345 A | * | 7/2021 | |
| KR | 10-2012-0040795 A | | 4/2012 | |
| KR | 10-2016-0084694 A | | 7/2016 | |
| KR | 10-2019-0073880 A | | 6/2019 | |
| KR | 10-2019-0077844 A | | 7/2019 | |
| WO | WO-2013190673 A1 | * | 12/2013 | ............... H02K 3/18 |
| WO | 2015/005050 A1 | | 1/2015 | |
| WO | 2019/132338 A1 | | 7/2019 | |
| WO | WO-2023234266 A1 | * | 12/2023 | |

OTHER PUBLICATIONS

International Search Report dated Feb. 8, 2021 in International Application No. PCT/KR2020/015221.

Office Action dated Aug. 20, 2024 in Japanese Application No. 2022-537057.

* cited by examiner

MOTOR

CROSS-REFERENCE TO RELATED APPLICATIONS

This application is the U.S. national stage application of International Patent Application No. PCT/KR2020/015221, filed Nov. 3, 2020, which claims the benefit under 35 U.S.C. § 119 of Korean Application No. 10-2019-0169846, filed Dec. 18, 2019, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like. For example, in an electronic power steering (EPS) system in which a motor is used, an electronic control unit (ECU) drives the motor according to traveling conditions to secure turning stability and quickly provide a restoring force. Accordingly, a vehicle driver can drive safely.

A motor may include a housing, a shaft, a stator disposed on an inner circumferential surface of the housing, a rotor disposed on an outer circumferential surface of the shaft, and the like. In this case, the stator induces an electrical interaction with the rotor to induce rotation of the rotor.

In addition, the stator may include a stator core, coils wound around the stator core, and insulators disposed between the stator core and the coils. In this case, the stator core may include a plurality of teeth disposed apart from each other, and accordingly, winding spaces in which the coils are wound may be formed between the teeth.

The coils may be wound around the teeth in a symmetric or asymmetric manner.

Generally, in order to improve the performance of the motor, the number of windings of the coil should be increased in the winding space, or a diameter of the coil should be increased. In this case, the winding space may be referred to as a slot.

However, when large diameter coils are wound in a symmetric manner to produce a high power motor, since a winding space becomes narrower in an inward direction, a problem that a coil wound around any one tooth collides with a coil wound around a tooth disposed adjacent thereto in a winding space occurs.

In addition, there is a problem that it is also difficult to secure a space in which an insulating paper is disposed between a coil wound around any one tooth and a coil wound around a tooth disposed adjacent thereto.

An insulator for winding a coil in an asymmetric manner is required to overcome such a spatial limitation.

Technical Problem

The present invention is directed to providing a motor in which a coil is asymmetrically wound using an insulator which guides an arrangement of the coil.

Objectives to be solved by the present invention are not limited to the above-described objectives, and other objectives, which are not described above, will be clearly understood by those skilled in the art from the following description.

Technical Solution

One aspect of the present invention provides a motor including a stator, a rotor disposed inside the stator, and a shaft coupled to the rotor, wherein the stator includes a stator core, a coil wound around the stator core, and an insulator disposed between the stator core and the coil, the insulator includes an upper insulator and a lower insulator, an upper body of the upper insulator includes a first side wall portion, a second side wall portion disposed apart from the first side wall portion, and a first cover portion extending from an end portion of the first side wall portion and connected to one end portion of the second side wall portion, and the number of a plurality of first grooves formed in the first side wall portion is different from the number of a plurality of second grooves formed in the second side wall portion.

In this case, the first cover portion may include a plurality of third grooves, and the number of the third grooves may be equal to the number of the first grooves.

In addition, the number of the first grooves may be an even number, and the number of the second grooves may be an odd number. In addition, a separation part formed to have a predetermined length (d) may be disposed between any one of the plurality of first grooves and another thereof. In addition, the length of the separation part may be smaller than a diameter of the coil.

The first grooves may include a 1-1 groove, a 1-2 groove, a 1-3 groove, and a 1-4 groove, the second grooves may include a 2-1 groove, a 2-2 groove, a 2-3 groove, a 2-4 groove, a 2-5 groove, a 2-6 groove, and a 2-7 groove, the third grooves may include a 3-1 groove, a 3-2 groove, a 3-3 groove, and a 3-4 groove, the 3-1 groove may connect the 1-1 groove and the 2-2 groove, the 3-2 groove may connect the 1-2 groove and the 2-4 groove, the 3-3 groove may connect the 1-3 groove and the 2-6 groove, and the 3-4 groove may connect the 1-4 groove and the 2-7 groove.

In this case, the upper insulator may include an inner guide disposed at an inner side of the upper body and an outer guide disposed at an outer side of the upper body, and the 3-1 groove, the 3-2 groove, the 3-3 groove, and the 3-4 groove may be disposed in order in a direction from the outer guide toward the inner guide.

In addition, with respect to a virtual line (L) disposed perpendicular to a radial direction, the 3-1 groove may be formed to have a first inclination angle ($\theta 1$), the 3-2 groove may be formed to have a second inclination angle ($\theta 2$), the 3-3 groove may be formed to have a third inclination angle ($\theta 3$), the 3-4 groove may be formed to have a fourth inclination angle ($\theta 4$), the second inclination angle ($\theta 2$) may be greater than the first inclination angle ($\theta 1$), and the third inclination angle ($\theta 3$) may be greater than the second inclination angle ($\theta 2$).

A separation part formed to have a predetermined length (d) may be disposed between the 1-3 groove and the 1-4 groove.

The fourth inclination angle ($\theta 4$) may be smaller than the third inclination angle ($\theta 3$).

Winding of the coil may start from the 2-1 groove of the second grooves, and in a fifth turn, the coil may be disposed apart from and face the separation part in a circumferential direction.

In a sixth turn, the coil may be disposed in the 2-5 groove of the second grooves.

In a seventh turn, the coil may be disposed in the 2-3 groove of the second grooves.

Meanwhile, a lower body of the lower insulator may include a third side wall portion, a fourth side wall portion disposed apart from the third side wall portion, and a second cover portion extending from an end portion of the third side wall portion and connected to one end portion of the fourth side wall portion, a plurality of fourth grooves formed in the third side wall portion may be disposed to correspond to the first grooves, and a plurality of fifth grooves formed in the fourth side wall portion may be disposed to correspond to the second grooves.

In this case, the second cover portion may include a plurality of sixth grooves, and the number of the sixth grooves may be equal to the number of the fourth grooves.

In addition, the fourth grooves may include a 4-1 groove, a 4-2 groove, a 4-3 groove, and a 4-4 groove, the fifth grooves may include a 5-1 groove, a 5-2 groove, a 5-3 groove, a 5-4 groove, a 5-5 groove, a 5-6 groove, and a 5-7 groove, and the sixth grooves may include a 6-1 groove, a 6-2 groove, a 6-3 groove, and a 6-4 groove.

Advantageous Effects

According to embodiments, when a coil with an increased diameter is used, the performance of a motor can be improved by asymmetrically winding the coil using an insulator which guides an arrangement of the coil.

Various useful advantages and effects of the embodiments are not limited to the above-described contents and will be more easily understood from descriptions of the specific embodiments.

MODES OF THE INVENTION

Figure 1:
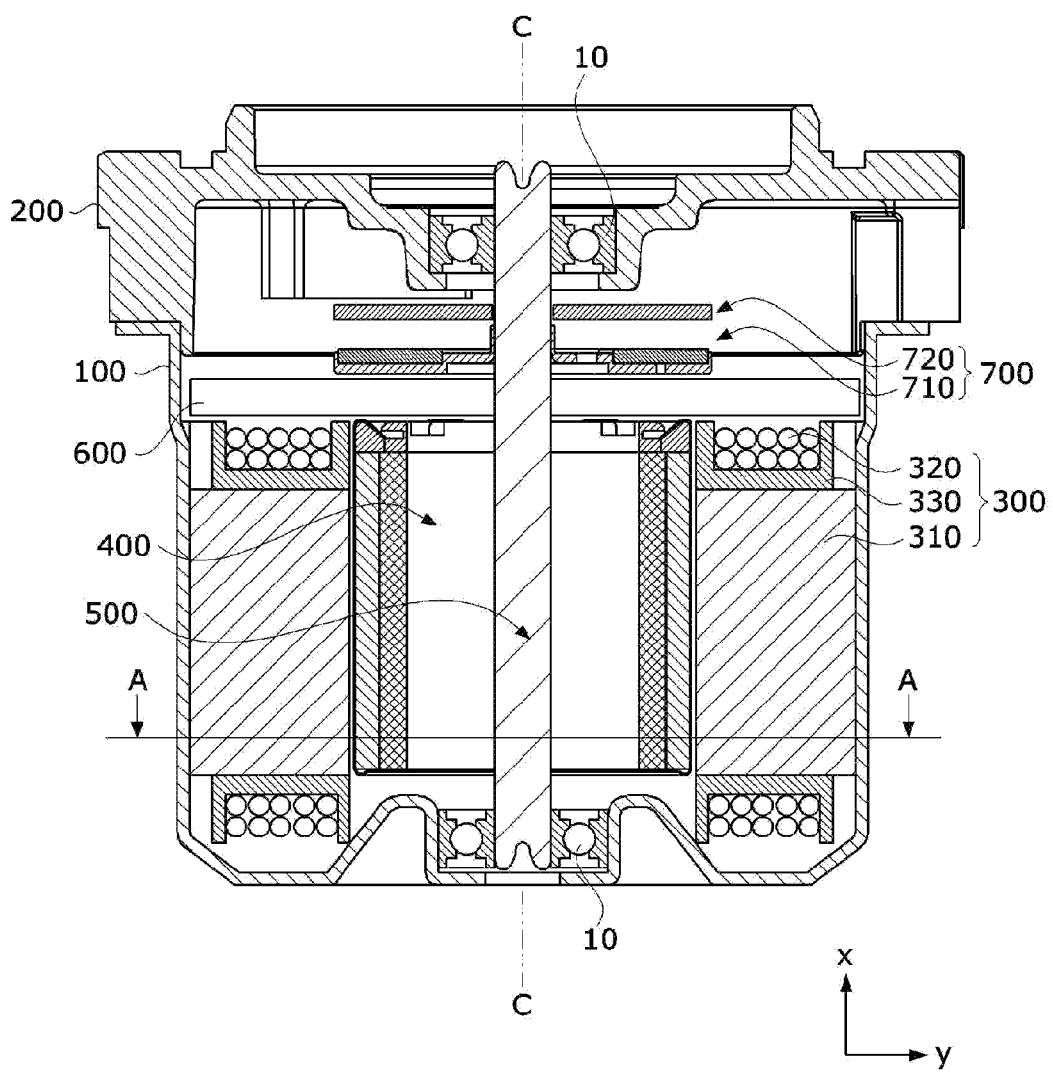
FIG. 1 is a view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a view illustrating a motor according to an embodiment. In FIG. 1, an x direction may be an axial direction, and a y direction may be a radial direction. In addition, the axial direction and the radial direction may be perpendicular to each other.

Referring to FIG. 1, a motor 1 according to the embodiment may include a housing 100 having one side at which an opening is formed, a cover 200 disposed on the housing 100, a stator 300 disposed in the housing 100, a rotor 400 disposed inside the stator 300, a shaft 500 which rotates along with the rotor 400, a busbar 600 disposed on the stator 300, and a sensor part 700 which detects rotation of the shaft 500. In this case, the term "inward" refers to a direction toward a center C based on the center C, and the term "outward" refers to a direction opposite to "inward."

The motor 1 may be a motor used in an electronic power steering (EPS) system. The EPS system supplements a steering force using a driving force of the motor to secure turning stability and rapidly provide a restoring force, so that a driver can drive safely.

The housing 100 and the cover 200 may form an exterior of the motor 1. In addition, the housing 100 and the cover 200 may be coupled to form an accommodation space. Accordingly, as illustrated in FIG. 1, the stator 300, the rotor 400, the shaft 500, and the like may be disposed in the accommodation space. In this case, the shaft 500 is rotatably disposed in the accommodation space. Accordingly, the motor 1 may further include bearings 10 on upper and lower portions of shaft 500.

The housing 100 may be formed in a cylindrical shape. In addition, the housing 100 may accommodate the stator 300, the rotor 400, and the like therein. In this case, a shape or material of the housing 100 may be variously changed. For example, the housing 100 may be formed of a metal material which firmly withstands even high temperatures.

The cover 200 may be disposed on an open surface of the housing 100 to cover the opening of the housing 100, that is, on the housing 100.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Figure 2:
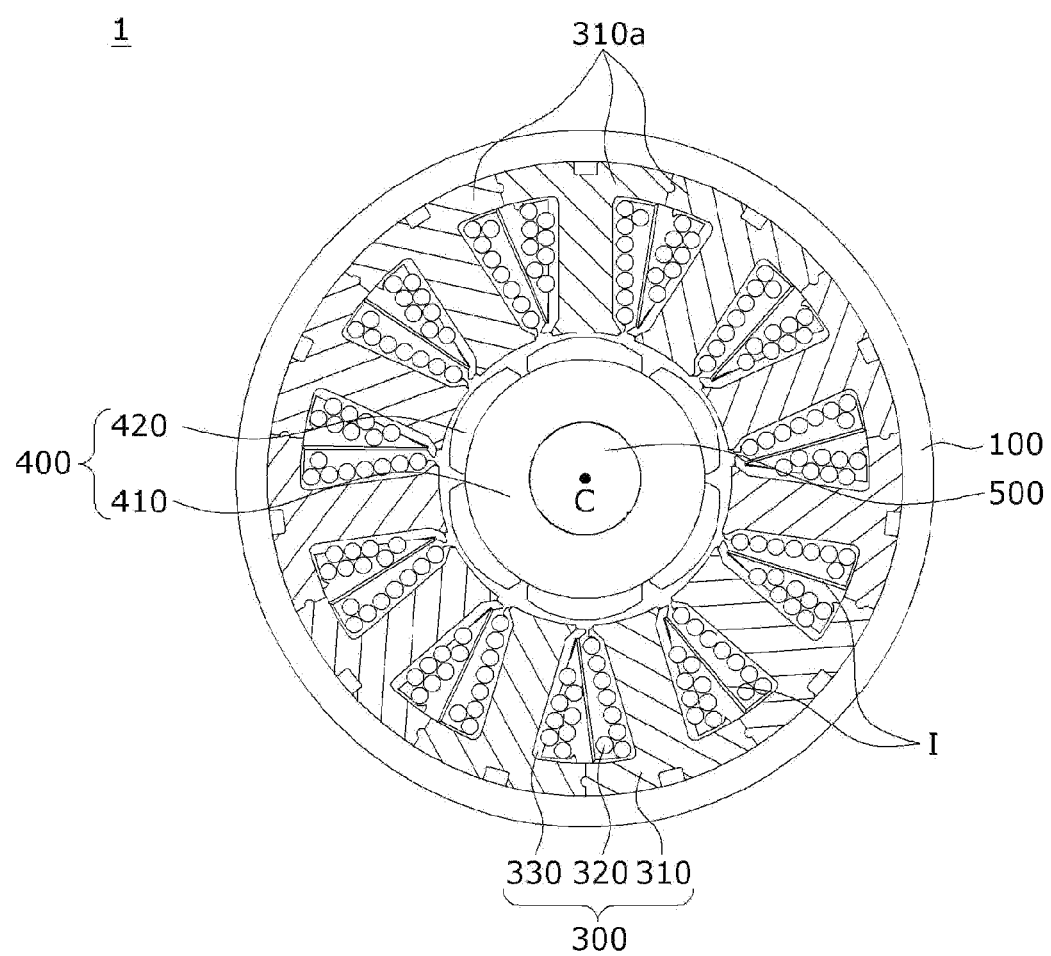
FIG. 2 is a cross-sectional view along line A-A of FIG. 1.
Figure 3:
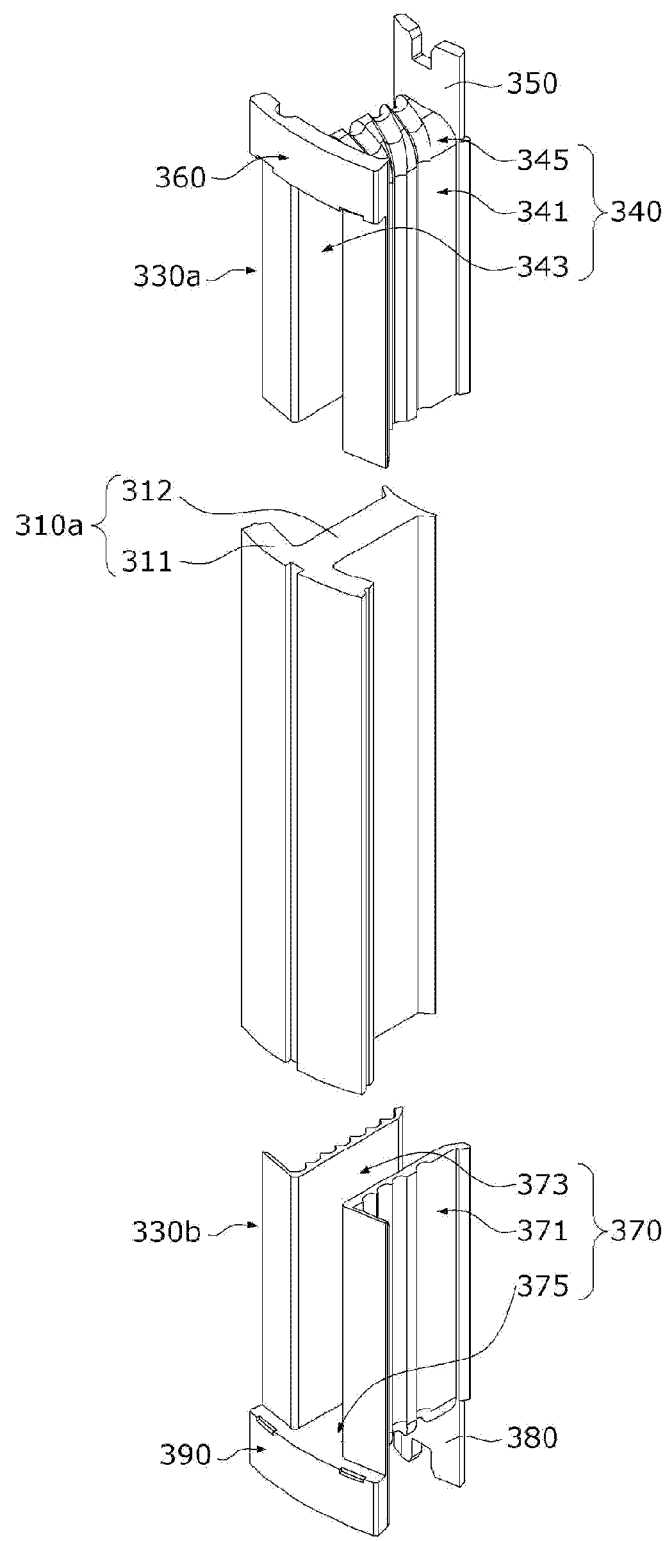
FIG. 3 is a perspective view illustrating a layout of a unit stator core and an insulator of a stator disposed in the motor according to the embodiment.

FIG. 2 is a cross-sectional view along line A-A of FIG. 1, and FIG. 3 is a perspective view illustrating a layout of a unit stator core and an insulator of the stator disposed in the motor according to the embodiment.

Referring to FIGS. 2 and 3, the stator 300 may include a stator core 310, coils 320 wound around the stator core 310, and insulators 330 disposed between the stator core 310 and the coils 320.

The coils 320 which generate a rotating magnetic field may be wound around the stator core 310.

The stator core 310 may be formed in a form in which a plurality of thin steel plates are stacked, but the present invention is not necessarily limited thereto. For example, the stator core 310 may also be formed as one single part.

In addition, the stator core 310 may be formed by a plurality of unit stator cores 310a disposed in a circumferential direction.

Referring to FIG. 3, the unit stator cores 310a may include yokes 311 having an arc shape and teeth 312. In addition, each of the teeth 312 may be formed to protrude from an inner circumferential surface 311a of the yoke 311 in a radial direction for winding of the coil 320. In this case, an example in which the yoke 311 and the tooth 312 are integrally formed is illustrated, but the present invention is not necessarily limited thereto.

Meanwhile, the teeth 312 may be disposed to face magnets 420 of the rotor 400. In addition, the coils 320 are wound around the teeth 312.

The insulator 330 insulates the stator core 310 from the coil 320. Accordingly, the insulator 330 may be disposed between the stator core 310 and the coil 320.

In this case, the coil 320 may be wound around the stator core 310 on which the insulator 330 is disposed. In addition, a rotational magnetic field may be generated by the coil 320 due to the supply of a current.

In addition, the insulator 330 may be disposed on the tooth 312 of the stator core 310 to insulator the stator core 310 from the coil 320. In this case, the insulator 330 may be formed of a synthetic resin such as a plastic.

Referring to FIG. 3, the insulator 330 may include an upper insulator 330a disposed on the tooth 312 and a lower insulator 330b.

Figure 4:
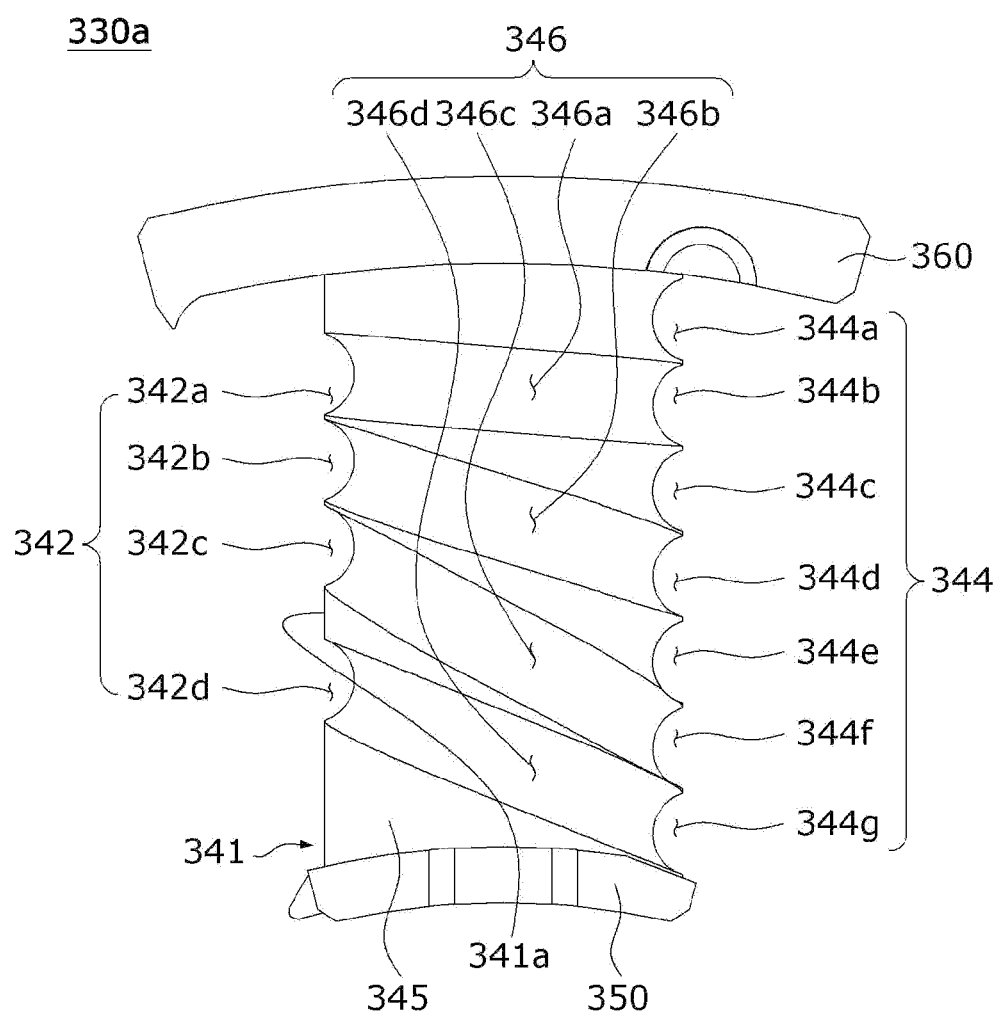
FIG. 4 is a plan view illustrating an upper insulator of the stator disposed in the motor according to the embodiment.
Figure 5:
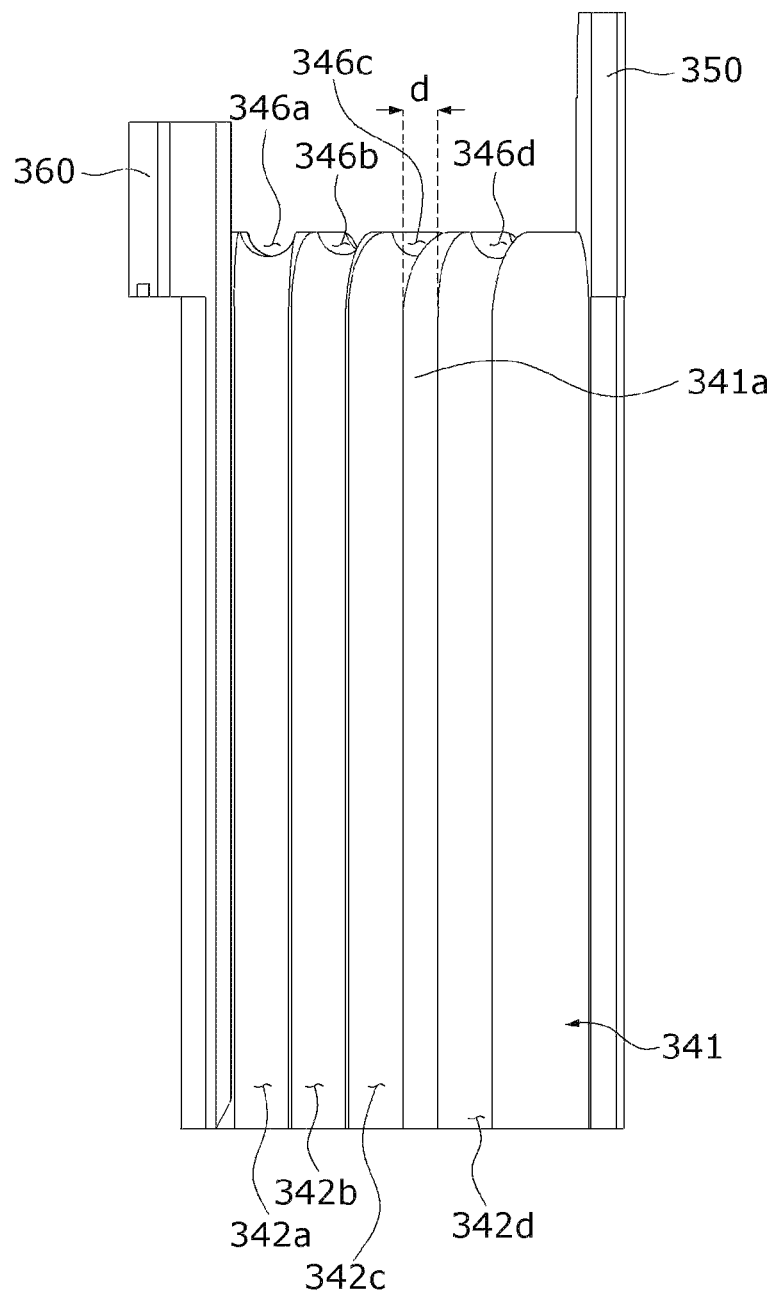
FIG. 5 is a left side view illustrating the upper insulator of the stator disposed in the motor according to the embodiment.
Figure 6:
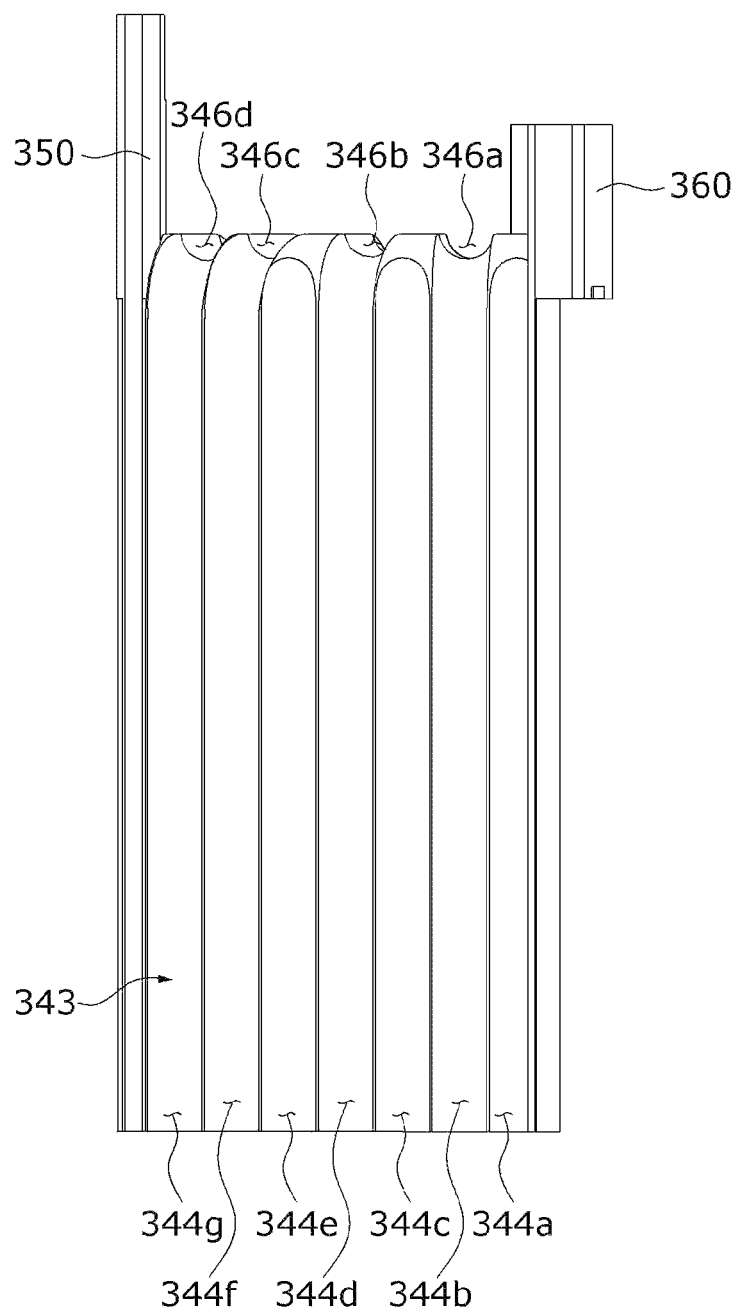
FIG. 6 is a right side view illustrating the upper insulator of the stator disposed in the motor according to the embodiment.

FIG. 4 is a plan view illustrating the upper insulator of the stator disposed in the motor according to the embodiment, FIG. 5 is a left side view illustrating the upper insulator of the stator disposed in the motor according to the embodiment, and FIG. 6 is a right side view illustrating the upper insulator of the stator disposed in the motor according to the embodiment.

Referring to FIGS. 3 to 6, the upper insulator 330a may include an upper body 340 around which the coil 320 is wound, a first inner guide 350 extending to protrude from an inner side of the upper body 340 in a longitudinal direction of the shaft 500, and a first outer guide 360 extending to protrude from an outer side of the upper body 340. In this case, the upper body 340, the first inner guide 350, and the first outer guide 360 may be integrally formed.

The coil 320 may be wound around the upper body 340.

The upper body 340 may be disposed on the tooth 312 of the stator core 310 and insulate the stator core 310 from the coil 320.

The upper body 340 may be formed to have a cross-sectional surface having a "⊂" shape. Accordingly, the upper body 340 may be disposed to cover an upper portion of the tooth 312 and a part of a side surface thereof.

In addition, in the upper body 340, a plurality of grooves may be formed. In this case, the grooves may have groove shapes concavely formed in the upper body 340. In addition, when the coil 320 is wound, the grooves may guide an arrangement of the coil 320.

Referring to FIGS. 3 and 4, the upper body 340 may include a first side wall portion 341, a second side wall portion 343 disposed apart from the first side wall portion 341 in the circumferential direction, and a first cover portion 345 extending from an end portion of the first side wall portion 341 and connected to one end portion of the second side wall portion 343.

In addition, grooves which guide the arrangement of the coil 320 may be formed in the first side wall portion 341, the second side wall portion 343, and the first cover portion 345. In this case, the number of a plurality of first grooves 342 formed in the first side wall portion 341 may be different from the number of a plurality of second grooves 344 formed in the second side wall portion 343.

For example, the number of the first grooves 342 may be less than the number of the second grooves 344. In this case, the number of the first grooves 342 may be an even number, and the number of the second grooves 344 may be an odd number. As illustrated in FIG. 4, the number of the first grooves 342 may be four, and the number of the second grooves 344 may be seven.

The first side wall portion 341 may be formed in a plate shape and disposed to cover one of two side surfaces of the tooth 312.

In addition, the plurality of first grooves 342 may be formed in the first side wall portion 341.

The first grooves 342 may include a 1-1 groove 342a, a 1-2 groove 342b, a 1-3 groove 342c, and a 1-4 groove 342d. In this case, the 1-1 groove 342a, the 1-2 groove 342b, the 1-3 groove 342c, and the 1-4 groove 342d may be disposed in order in the radial direction from the first outer guide 360 toward the first inner guide 350.

In addition, the first side wall portion 341 may include a separation part 341a formed between the 1-3 groove 342c and the 1-4 groove 342d and having a predetermined length d. Accordingly, the 1-4 groove 342d may be disposed apart from the 1-3 groove 342c by the separation part 341a in the radial direction. In this case, the separation part 341a may be referred to as a first separation part or upper separation part.

The separation part 341a may not be formed on the second side wall portion 343 and may be a flat section in which the first groove 342 is not formed on a surface of the first side wall portion 341. In this case, the length d of the separation part 341a may be smaller than a diameter of the coil 320.

In addition, a winding position on the first side wall portion 341 and a winding position on the second side wall portion 343 may be changed by the separation part 341a. Accordingly, an asymmetric winding structure of the coil 320 with respect to the tooth 312 may be implemented on the insulator 330 of the stator 300.

The second side wall portion 343 may be formed in a plate shape and disposed to cover the other of two side surfaces of the tooth 312.

In addition, the plurality of second grooves 344 may be formed in the second side wall portion 343.

The second grooves 344 may include a 2-1 groove 344a, a 2-2 groove 344b, a 2-3 groove 344c, a 2-4 groove 344d, a 2-5 groove 344e, a 2-6 groove 344f, and a 2-7 groove 344g. In this case, the 2-1 groove 344a, the 2-2 groove 344b, the 2-3 groove 344c, the 2-4 groove 344d, the 2-5 groove 344e, the 2-6 groove 344f, and the 2-7 groove 344g may be disposed in order in the radial direction from the first outer guide 360 toward the first inner guide 350.

The first cover portion 345 may connect an upper end portion of the first side wall portion 341 and an upper end portion of the second side wall portion 343.

In addition, a plurality of third grooves 346 may be formed in the first cover portion 345. In this case, the number of the third grooves 346 may be equal to the number of the first grooves 342.

The third grooves 346 may include a 3-1 groove 346a, a 3-2 groove 346b, a 3-3 groove 346c, and a 3-4 groove 346d. In this case, the 3-1 groove 346a, the 3-2 groove 346b, the 3-3 groove 346c, and the 3-4 groove 346d may be disposed in order in the radial direction from the first outer guide 360 toward the first inner guide 350.

In addition, the 3-1 groove 346a may connect the 1-1 groove 342a and the 2-2 groove 344b, the 3-2 groove 346b may connect the 1-2 groove 342b and the 2-4 groove 344d, the 3-3 groove 346c may connect the 1-3 groove 342c and the 2-6 groove 344f, and the 3-4 groove 346d may connect the 1-4 groove 342d and the 2-7 groove 344g.

Figure 7:
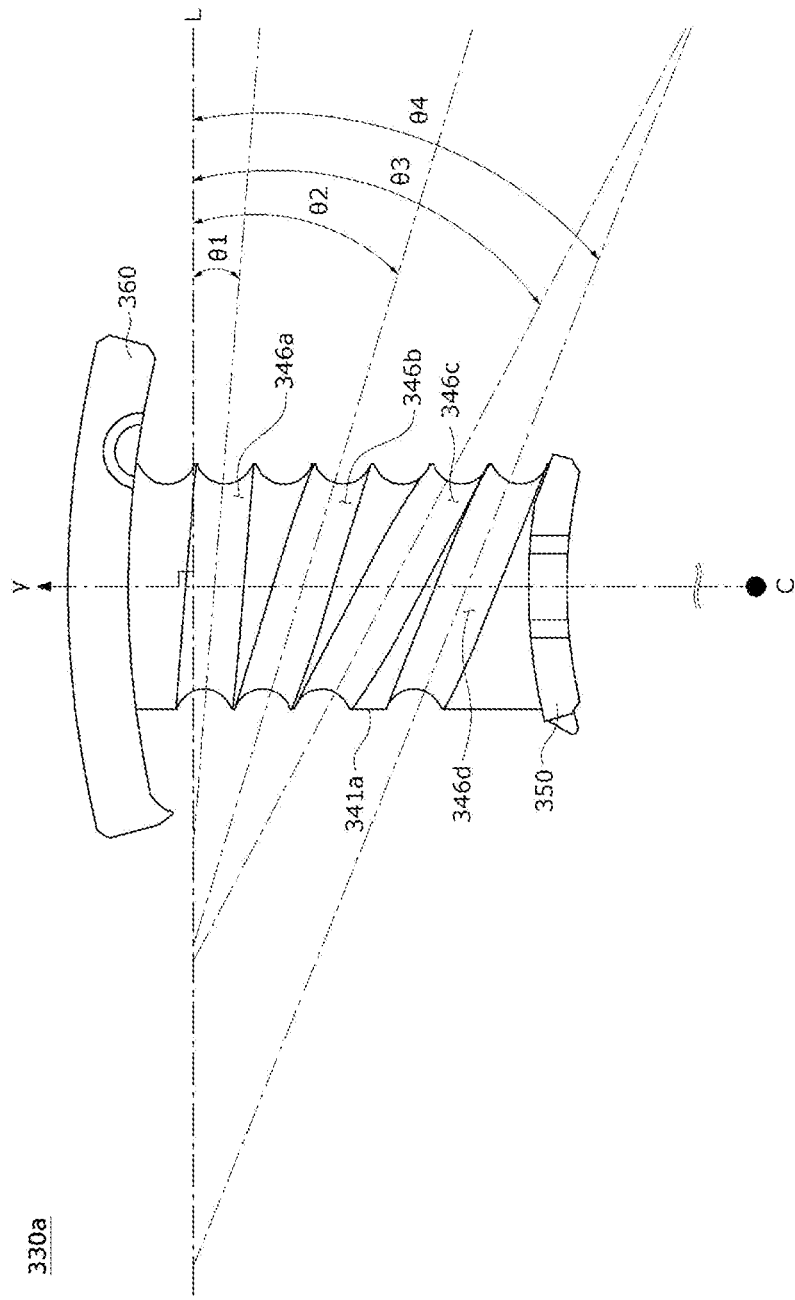
FIG. 7 is a view illustrating inclination angles of third grooves formed in the upper insulator of the stator disposed in the motor according to the embodiment.

FIG. 7 is a view illustrating inclination angles of third grooves formed in the upper insulator of the stator disposed in the motor according to the embodiment.

Referring to FIG. 7, the plurality of third grooves 346 may be formed to have inclination angles different from each other with respect to a virtual line L disposed perpendicular to the radial direction when viewed from above. That is, the inclination angles of the plurality of third grooves 346 may be different from each other. In this case, when viewed from above, the line L may be a line perpendicular to a line connecting the center C and a center of the first cover portion 345 in the circumferential direction. Alternatively, the line L may be a line parallel to a tangent line of one side of an outer circumferential surface of the shaft 500.

As illustrated in FIG. 7, the 3-1 groove 346a may be formed to have a first inclination angle θ1, the 3-2 groove 346b may be formed to have a second inclination angle θ2, the 3-3 groove 346c may be formed to have a third inclination angle θ3, and the 3-4 groove 346d may be formed to have a fourth inclination angle θ4.

In this case, the second inclination angle θ2 of the 3-2 groove 346b may be greater than the first inclination angle θ1 of the 3-1 groove 346a. In addition, the third inclination angle θ3 of the 3-3 groove 346c may be greater than the second inclination angle θ2 of the 3-2 groove 346b. In addition, the fourth inclination angle θ4 of the 3-4 groove 346d may be smaller than the third inclination angle θ3 of the 3-3 groove 346c due to the separation part 341a.

The first inner guide 350 supports the coil 320 wound around the upper body 340 to inhibit the coil 320 from escaping inward.

The first inner guide 350 may be disposed at the inner side of the upper body 340. In addition, the first inner guide 350 may be formed to protrude from the inner side of the upper body 340 in an axial direction and the circumferential direction. In this case, the axial direction may be the longitudinal direction of the shaft 500.

The first outer guide 360 supports the coil 320 wound around the upper body 340 to inhibit the coil 320 from escaping outward.

The first outer guide 360 may be disposed at the outer side of the upper body 340. In addition, the first outer guide 360 may protrude from the outer side of the upper body 340 in the axial and circumferential directions.

Figure 8:
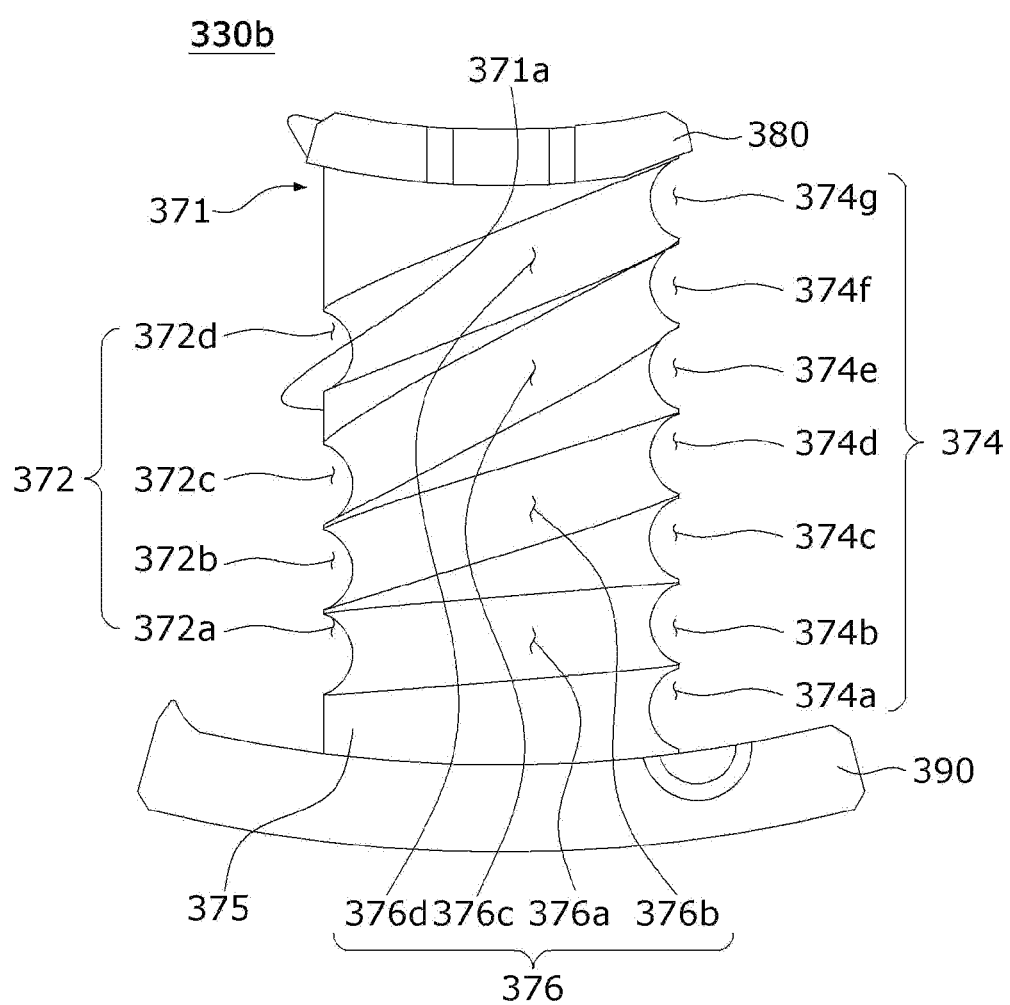
FIG. 8 is a bottom view illustrating a lower insulator of the stator disposed in the motor according to the embodiment.
Figure 9:
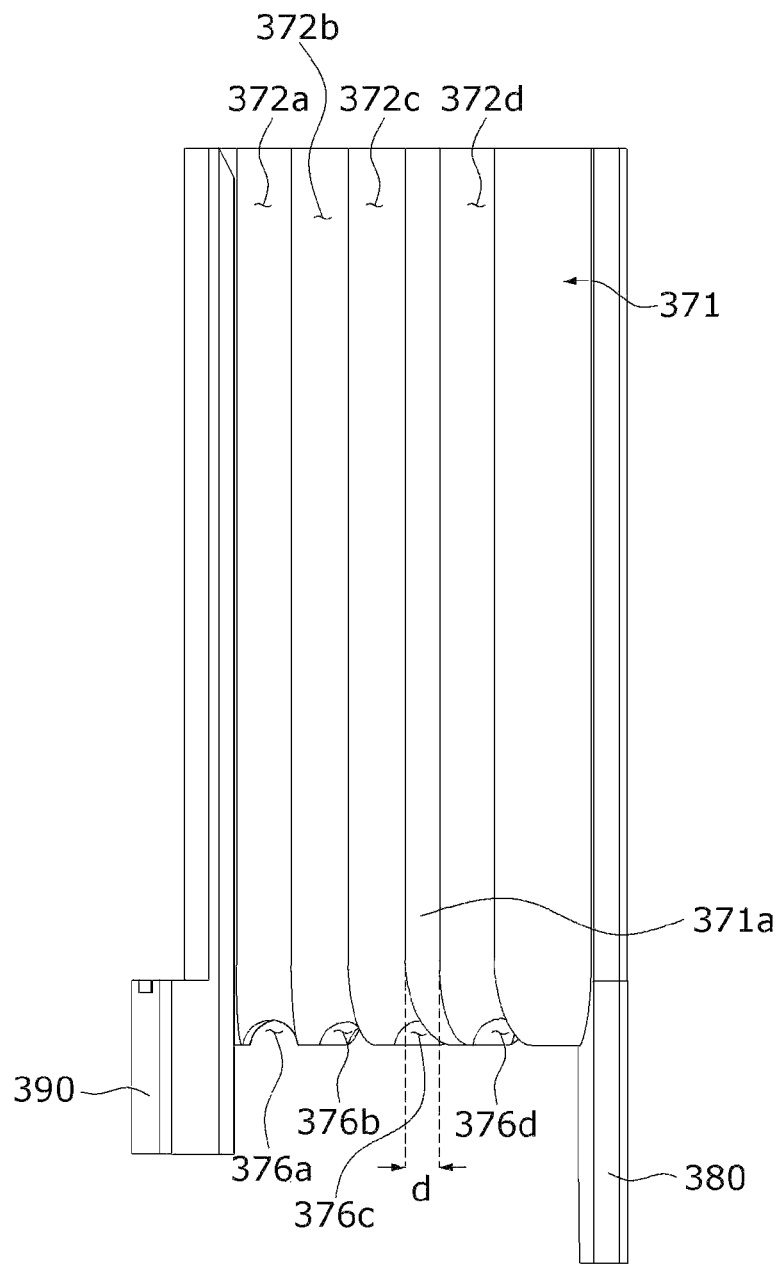
FIG. 9 is a left side view illustrating the lower insulator of the stator disposed in the motor according to the embodiment.
Figure 10:
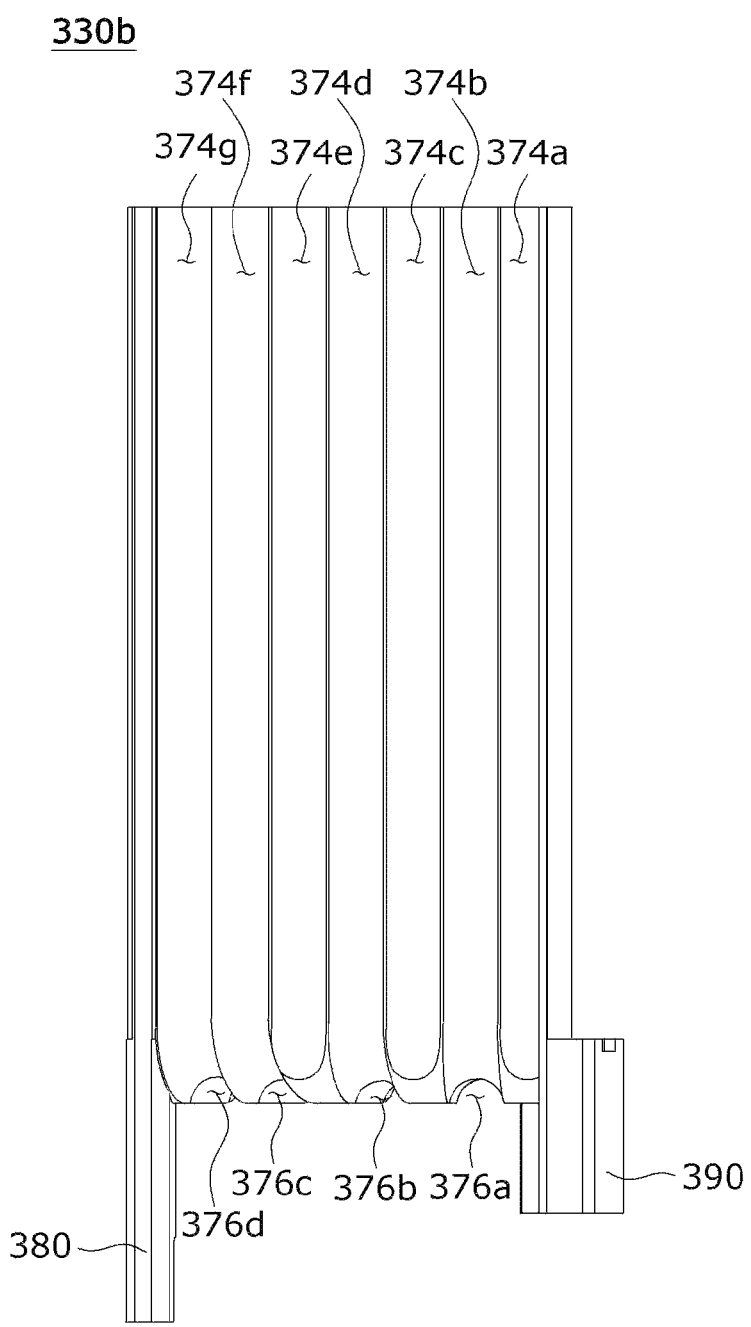
FIG. 10 is a right side view illustrating the lower insulator of the stator disposed in the motor according to the embodiment.

FIG. 8 is a bottom view illustrating the lower insulator of the stator disposed in the motor according to the embodiment, FIG. 9 is a left side view illustrating the lower insulator of the stator disposed in the motor according to the embodiment, and FIG. 10 is a right side view illustrating the lower insulator of the stator disposed in the motor according to the embodiment.

Referring to FIGS. 8 to 10, the lower insulator 330b may include a lower body 370 around which the coil 320 is wound, a second inner guide 380 extending to protrude from an inner side of the lower body 370 in the longitudinal direction of the shaft 500, and a second outer guide 390 extending to protrude from an outer side of the lower body 370. In this case, the lower body 370, the second inner guide 380, and the second outer guide 390 may be integrally formed.

The coil 320 may be wound around the lower body 370.

The lower body 370 may be disposed on the tooth 312 of the stator core 310 and insulate the stator core 310 from the coil 320.

The lower body 370 may be formed to have a cross-sectional surface having a "c" shape. Accordingly, the lower body 370 may be disposed to cover a lower portion and a part of the side surface of the tooth 312.

In addition, a plurality of grooves may be formed in the lower body 370. In this case, the grooves may have groove shapes concavely formed in the lower body 370. In addition, when the coil 320 is wound, the grooves may guide an arrangement of the coil 320.

Referring to FIGS. 8 to 10, the lower body 370 may include a third side wall portion 371, a fourth side wall portion 373 disposed apart from the third side wall portion 371 in the circumferential direction, and a second cover portion 375 extending from an end portion of the third side wall portion 371 and connected to one end portion of the fourth side wall portion 373.

In addition, grooves which guide an arrangement of the coil 320 may be formed in the third side wall portion 371, the fourth side wall portion 373, and the second cover portion 375. In this case, the number of a plurality of fourth grooves 372 formed in the third side wall portion 371 may be different from the number of a plurality of fifth grooves 374 formed in the fourth side wall portion 373.

In this case, the plurality of fourth grooves 372 formed in the third side wall portion 371 may be disposed to correspond to the first grooves 342, and the plurality of fifth grooves 374 formed in the fourth side wall portions 373 may be disposed to correspond to the second grooves 344.

Accordingly, the number of the fourth grooves 372 may be less than the number of the fifth grooves 374. In this case, the number of the fourth grooves 372 may be an even number, and the number of the fifth grooves 374 may be an odd number. As illustrated in FIG. 8, the number of the fourth grooves 372 may be four, and the number of the fifth grooves 374 may be seven.

The third side wall portion 371 may be formed in a plate shape and disposed to cover one of two side surfaces of the tooth 312.

In addition, the plurality of fourth grooves 372 may be formed in the third side wall portion 371.

The fourth grooves 372 may include a 4-1 groove 372a, a 4-2 groove 372b, a 4-3 groove 372c, and a 4-4 groove 372d. In this case, the 4-1 groove 372a, the 4-2 groove 372b, the 4-3 groove 372c, and the 4-4 groove 372d may be disposed in order in the radial direction from the second outer guide 390 toward the second inner guide 380.

In addition, the third side wall portion 371 may include a separation part 371a formed between the 4-3 groove 372c and the 4-4 groove 372d and having the predetermined length d. Accordingly, the 4-4 groove 372d may be disposed apart from the 4-3 groove 372c in the radial direction due to the separation part 371a. In this case, the separation part 371a may be referred to as a second separation part or lower separation part.

The separation part 371a may not be formed on the fourth side wall portion 373 and may be a flat section in which the fourth groove 372 is not formed in a surface of the third side wall portion 371. In this case, the length d of the separation part 371a may be smaller than the diameter of the coil 320.

In addition, a winding position on the third side wall portion 371 and a winding position on the fourth side wall portion 373 may be changed due to the separation part 371a. Accordingly, an asymmetric winding structure of the coil 320 with respect to the tooth 312 may be implemented on the insulator 330 of the stator 300.

The fourth side wall portion 373 may be formed in a plate shape and disposed to cover the other of two side surfaces of the tooth 312.

In addition, a plurality of fifth grooves 374 may be formed in the fourth side wall portion 373.

The fifth grooves 374 may include a 5-1 groove 374a, a 5-2 groove 374b, a 5-3 groove 374c, a 5-4 groove 374d, a 5-5 groove 374e, a 5-6 groove 374f, and a 5-7 groove 374g. In this case, the 5-1 groove 374a, the 5-2 groove 374b, the 5-3 groove 374c, the 5-4 groove 374d, the 5-5 groove 374e, the 5-6 groove 374f, and the 5-7 groove 374g may be disposed in order in the radial direction from the second outer guide 390 toward the second inner guide 380.

The second cover portion 375 may connect an upper end portion of the third side wall portion 371 and an upper end portion of the fourth side wall portion 373.

In addition, a plurality of sixth grooves 376 may be formed in the second cover portion 375. In this case, the number of the sixth grooves 376 may be equal to the number of the fourth grooves 372.

The sixth grooves 376 may include a 6-1 groove 376a, a 6-2 groove 376b, a 6-3 groove 376c, and a 6-4 groove 376d. In this case, the 6-1 groove 376a, the 6-2 groove 376b, the 6-3 groove 376c, and the 6-4 groove 376d may be disposed in order in the radial direction from the second outer guide 390 toward the second inner guide 380.

In addition, the 6-1 groove 376a may connect the 4-1 groove 372a and the 5-2 groove 374b, the 6-2 groove 376b may connect the 4-2 groove 372b and the 5-4 groove 374d, the 6-3 groove 376c may connect the 4-3 groove 372c and the 5-6 groove 374f, and the 6-4 groove 376d may connect the 4-4 groove 372d and the 5-7 groove 374g.

Figure 11:
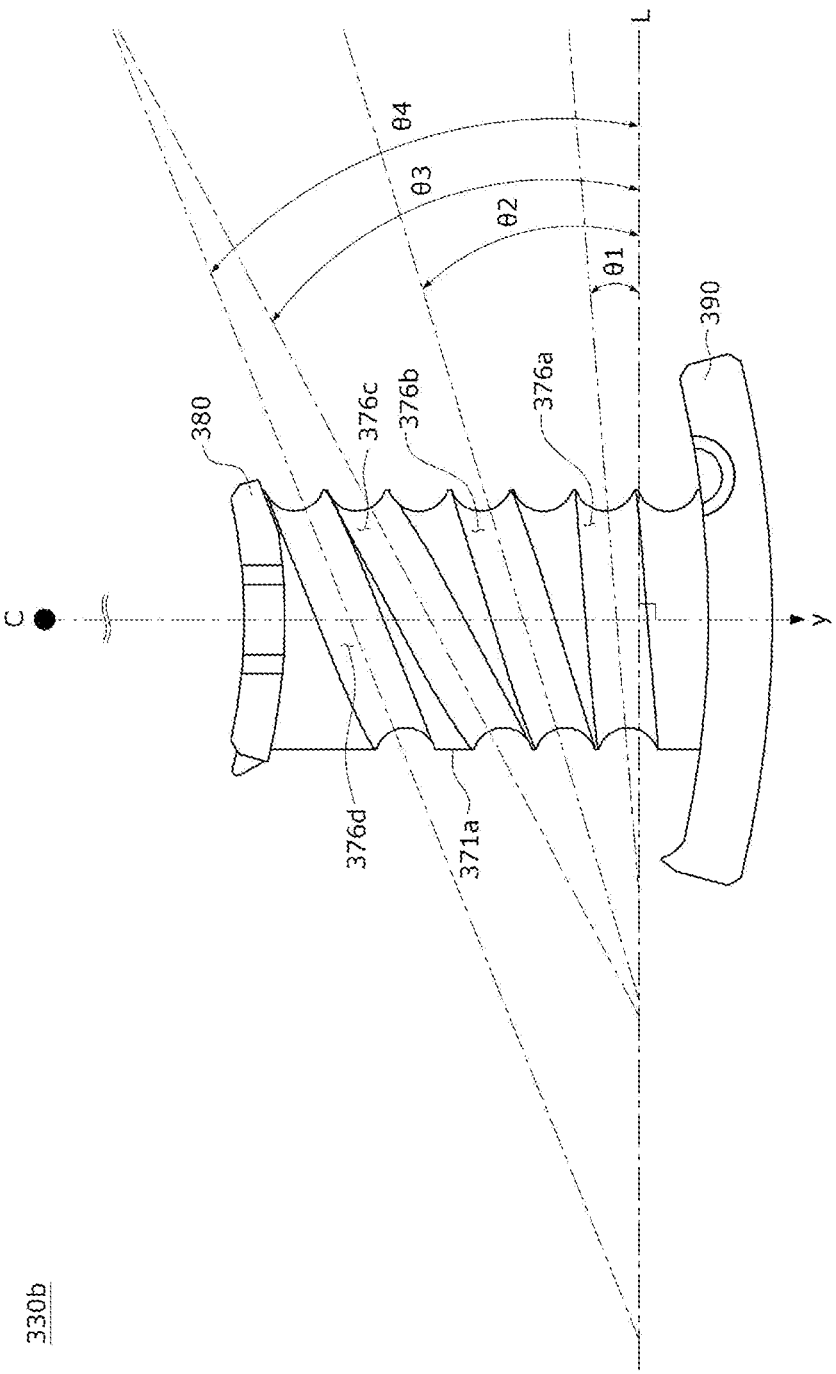
FIG. 11 is a view illustrating inclination angles of sixth grooves formed in the lower insulator of the stator disposed in the motor according to the embodiment.

FIG. 11 is a view illustrating inclination angles of the sixth grooves formed in the lower insulator of the stator disposed in the motor according to the embodiment.

Referring to FIG. 11, the plurality of sixth grooves 376 may be formed to have the inclination angles different from each other with respect to a virtual line L disposed perpendicular to the radial direction when viewed from above. That is, the inclination angles of the plurality of sixth grooves 376 may be different from each other. In this case, when viewed from above, the line L may be a line perpendicular to a line connecting the center C and a center of the second cover portion 375 in the circumferential direction. Alternatively, the line L may be a line parallel to a tangent line of one side of the outer circumferential surface of the shaft 500.

As illustrated in FIG. 11, the 6-1 groove 376a may be formed to have a first inclination angle θ1, the 6-2 groove 376b may be formed to have a second inclination angle θ2, the 6-3 groove 376c may be formed to have a third inclination angle θ3, and the 6-4 groove 376d may be formed to have a fourth inclination angle θ4.

In this case, the second inclination angle θ2 of the 6-2 groove 376b may be greater than the first inclination angle θ1 of the 6-1 groove 376a. In addition, the third inclination angle θ3 of the 6-3 groove 376c may be greater than the second inclination angle θ2 of the 6-2 groove 376b. In addition, the fourth inclination angle θ4 of the 6-4 groove 376d may be smaller than the third inclination angle θ3 of the 6-3 groove 376c due to the separation part 371a.

The second inner guide 380 supports the coil 320 wound around the lower body 370 to inhibit the coil 320 from escaping inward.

The second inner guide 380 may be disposed at the inner side of the lower body 370. In addition, the second inner guide 380 may be formed to protrude from the inner side of the lower body 370 in the axial and circumferential directions. In this case, in the axial direction may be the longitudinal direction of the shaft 500.

The second outer guide 390 supports the coil 320 wound around the lower body 370 to inhibit the coil 320 from escaping outward.

The second outer guide 390 may be disposed at the outer side of the lower body 370. In addition, the second outer guide 390 may be formed to protrude from the outer side of the lower body 370 in the axial and circumferential directions.

Figure 12:
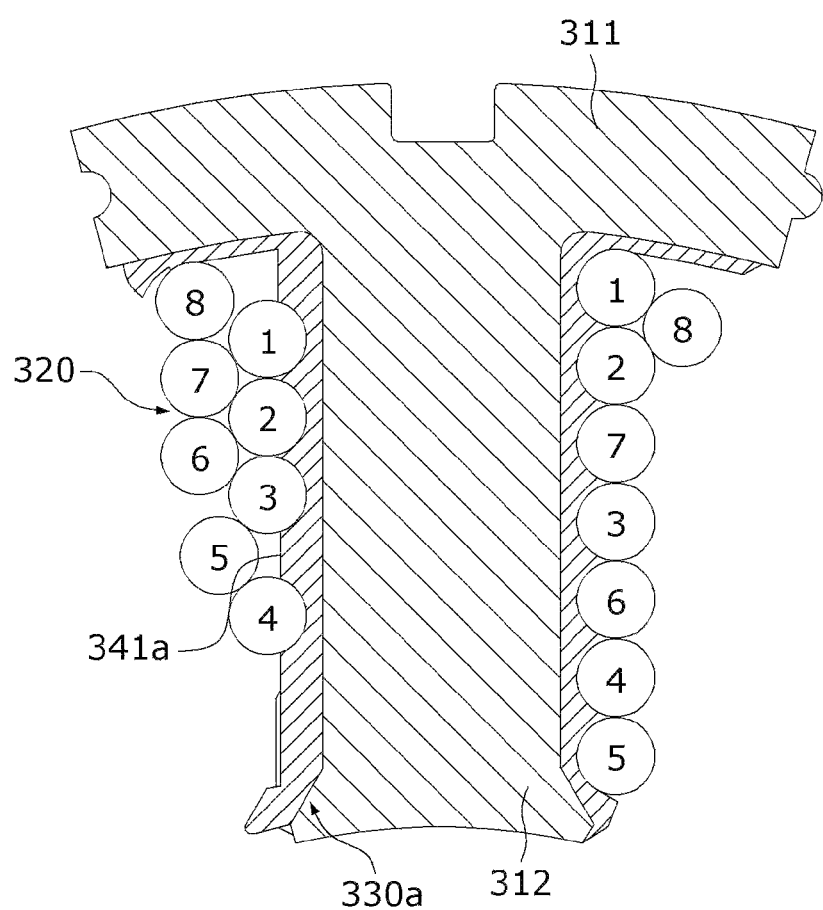
FIG. 12 is a view showing a winding order of a coil of the stator disposed in the motor according to the embodiment.

FIG. 12 is a view showing a winding order of the coil of the stator disposed in the motor according to the embodiment. In FIG. 12, a number written inside the coil 320 may refer to the number of winding turns of the coil 320 and a position in the winding order of the coil 320. In this case, although winding of the coil 320 has been described based on the upper insulator 330a, since the lower insulator 330b is also disposed to correspond to the upper insulator 330a, the winding order of the coil 320 around the lower insulator 330b may also be understood through the winding order of the coil 320 around the upper insulator 330a.

Referring to FIG. 12, winding of the coil 320 may start from the 2-1 groove 344a of the second grooves 344. In this case, an end portion of the coil 320 disposed in the 2-1 groove 344a may be referred to as a start end.

As illustrated in FIG. 12, in a first turn, the coil 320 may start to be wound in the 2-1 groove 344a and be disposed in the 1-1 groove 342a.

In addition, in a second turn of the coil 320, the coil 320 may be disposed in the 2-2 groove 344b and the 1-2 groove 342b.

In addition, in a third turn of the coil 320, the coil 320 may be disposed in the 2-4 groove 344d and the 1-3 groove 342c.

In addition, in a fourth turn of the coil 320, the coil 320 may be disposed in the 2-6 groove 344f and the 1-4 groove 342d.

In addition, in a fifth turn of the coil 320, the coil 320 may be disposed in contact with an outer circumferential surface of the coil 320 disposed in the 2-7 groove 344g and the 1-3 groove 342c and the outer circumferential surface of the coil 320 disposed in the 1-4 groove 342d. In this case, in the fifth turn of the coil 320, the coil 320 may be disposed apart from the separation part 341a and face the separation part 341a in the circumferential direction.

That is, in the fifth turn of the coil 320, a part of the coil 320 may be disposed in the 2-7 groove 344g. In addition, in the fifth turn of the coil 320, another part of the coil 320 may be disposed between and in contact with the coil 320 of the third turn and the coil 320 of the fourth turn. In this case, in the fifth turn of the coil 320, the coil 320 may be disposed apart from the separation part 341a in the circumferential direction.

In addition, in a sixth turn of the coil 320, the coil 320 may be disposed in contact with the outer circumferential surface of the coil 320 disposed in the 2-5 groove 344e and the 1-2 groove 342b and the outer circumferential surface of the coil 320 disposed in the 1-3 groove 342c. That is, in the sixth turn of the coil 320, a part of the coil 320 may be disposed in the 2-5 groove 344e. In addition, in the sixth turn of the coil 320, another part of the coil 320 may be disposed between and in contact with the coil 320 of the second turn and the coil 320 of the third turn.

In addition, in a seventh turn of the coil 320, the coil 320 may be disposed in contact with the outer circumferential surface of the coil 320 disposed in the 2-3 groove 344c and the 1-1 groove 342a and the outer circumferential surface of the coil 320 disposed in the 1-2 groove 342b. That is, in the seventh turn of the coil 320, a part of the coil 320 may be disposed in the 2-3 groove 344c. In addition, in the seventh turn of the coil 320, another part of the coil 320 may be disposed between and in contact with the coil 320 of the first turn and the coil 320 of the second turn.

In addition, in an eighth turn of the coil 320, the coil 320 may be disposed in contact with the coil 320 of the first turn. In this case, in the eighth turn of the coil 320, the coil 320 may be disposed in contact with the coil 320 of the seventh turn at a side of the first side wall portion 341. In addition, in the eighth turn of the coil 320, the coil 320 may be disposed in contact with the coil 320 of the second turn at a side of the second side wall portion 343.

Accordingly, as illustrated in FIG. 12, the coil 320 may start to be wound from the 2-1 groove 344a of the second grooves 344, and the coil 320 of the fifth turn may be disposed apart from the separation part 341a to face the separation part 341a in the circumferential direction.

In addition, the coil 320 of the sixth turn may be disposed in the 2-5 groove 344e of the second grooves 344.

In addition, in the seventh turn of the coil, the coil may be disposed in the 2-3 groove of the second grooves 344.

Accordingly, in the stator 300, the asymmetric winding structure of the coil 320 can be implemented using a difference in number of grooves formed in the insulator 330, the separation part 341a, and the inclination angles of the third grooves 346 and the sixth grooves 376.

Meanwhile, the stator 300 may further include insulating members I.

Referring to FIG. 2, the insulating members I may be disposed between the unit stator cores 310a in the circumferential direction and insulate the coils 320. For example, each of the insulating members I may insulate the coil 320 wound around one unit stator core 310a from the coil 320 wound around another unit stator core 310a disposed adjacent thereto in the circumferential direction.

The insulating member I may be formed in a rectangular hexahedron shape. In this case, the insulating member I may be an insulating paper. Accordingly, since the insulating paper is flexible and light, the insulating paper may not greatly affect the performance of the motor.

The rotor 400 may be disposed inside the stator 300. In addition, the shaft 500 may be coupled to a central portion of the rotor 400.

The rotor 400 may be formed so that the rotor core 410 is coupled to the magnets 420. For example, the rotor 400 may be formed in a form in which the magnets 420 are disposed on an outer circumferential surface of the rotor core 410.

Accordingly, the magnets 420, along with the coils 320 wound around the stator 300, may generate a rotational electromagnetic field. The magnets 420 may be disposed so that N-poles and S-poles are alternately positioned in the circumferential direction about the center of the shaft 500.

Accordingly, the rotor 400 rotates due to an electrical interaction between the coils 320 and the magnets 420, and when the rotor 400 rotates, the shaft 500 rotates to generate a driving force of the motor 1.

Meanwhile, the rotor core 410 of the rotor 400 may be manufactured in a form in which a plurality of divided cores are coupled or a single core form including one container. In this case, the rotor core 410 may be formed in a form in which a plurality of circular thin steel plates are stacked.

As illustrated in FIG. 1, the shaft 500 may be rotationally disposed in the housing 100 due to the bearings 10. In addition, the shaft 500 may rotate with the rotor 400 in conjunction with the rotation of the rotor 400.

In addition, the shaft 500 may be connected to a steering shaft of a vehicle. Accordingly, the steering shaft may receive power due to the rotation of the shaft 500.

The busbar 600 may be disposed on the stator 300.

In addition, the busbar 600 may be electrically connected to the coils 320 of the stator 300.

The busbar 600 may include a busbar body and a plurality of terminals disposed in the busbar body. In this case, the busbar body may be a molded part formed in an injection molding manner. In addition, each of the terminals may be electrically connected to the coil 320 of the stator 300.

The sensor part 700 may detect a position of the rotor 400 by detecting a magnetic force of sensing magnets installed to operate in conjunction with the rotation of the rotor 400 to detect the rotation of the shaft 500.

The sensor part 700 may include a sensing magnet assembly 710 and a printed circuit board (PCB) 720.

The sensing magnet assembly 710 is coupled to the shaft 500 to operate in conjunction with the rotation of the rotor 400 to detect a position of the rotor 400. In this case, the sensing magnet assembly 710 may include the sensing magnets and a sensing plate. The sensing magnets and the sensing plate may be coaxially coupled.

The sensing magnets may include main magnets disposed adjacent to a hole forming an inner circumferential surface thereof in the circumferential direction and sub-magnets formed at an edge thereof.

The main magnets may be arranged in the same way as the magnets 420 of the rotor 400 of the motor.

The sub-magnets may be divided further than the main magnets so that the sub-magnets may be formed to have poles of which the number is greater than the number of poles of the main magnets. Accordingly, a rotation angle of the rotor 400 may be divided and measured more precisely, and thus the motor 1 may be driven more smoothly.

The sensing plate may be formed of a disc type metal material. In addition, the sensing magnets may be coupled to an upper surface of the sensing plate. In addition, the sensing plate may be coupled to the shaft 500. In this case, a hole through which the shaft 500 passes may be formed in the sensing plate.

A sensor which detects the magnetic force of the sensing magnets may be disposed on the PCB 720. In this case, the sensor may be provided as a Hall integrated circuit (IC). In addition, the sensor may detect changes in an N-pole and an S-pole of the sensing magnets and generate a sensing signal.

While the present invention has been described with reference to the exemplary embodiments thereof, it will be understood by those skilled in the art that various changes in form and details may be made therein without departing from the spirit and scope of the invention as defined by the appended claims.

| REFERENCE NUMERALS | |
|---|---|
| 1: MOTOR | 100: HOUSING |
| 200: COVER | 300: STATOR |
| 310: STATOR CORE | 310A: STATOR CORE |
| 320: COIL | 330: INSULATOR |
| 330A: UPPER INSULATOR | 33OB: LOWER INSULATOR |
| 340: UPPER BODY | 341: FIRST SIDE WALL PORTION |
| 342: FIRST GROOVE | 343: SECOND SIDE WALL PORTION |
| 344: SECOND GROOVE | 345: FIRST COVER PORTION |
| 346: THIRD GROOVE | 350: FIRST INNER GUIDE |
| 360: FIRST OUTER GUIDE | 370: LOWER BODY |
| 371: THIRD SIDE WALL PORTION | |
| 372: FOURTH GROOVE | 373: FOURTH SIDE WALL PORTION |
| 374: FIFTH GROOVE | 375: SECOND COVER PORTION |
| 376: SIXTH GROOVE | 380: SECOND INNER GUIDE |
| 390: SECOND OUTER GUIDE | |
| 400: ROTOR | 500: SHAFT |
| 600: BUSBAR | 700: SENSOR PART |

The invention claimed is:

1. A motor comprising:
a stator;
a rotor disposed inside the stator; and
a shaft coupled to the rotor,
wherein the stator includes a stator core, a coil wound around the stator core, and an insulator disposed between the stator core and the coil,
wherein the insulator includes an upper insulator and a lower insulator,
wherein an upper body of the upper insulator includes a first side wall portion, a second side wall portion disposed apart from the first side wall portion, and a first cover portion extending from an end portion of the first side wall portion and connected to one end portion of the second side wall portion,
wherein the number of a plurality of first grooves formed in the first side wall portion is different from the number of a plurality of second grooves formed in the second side wall portion,
wherein the first cover portion includes a plurality of third grooves,
wherein the number of the third grooves is equal to the number of the first grooves,
wherein the plurality of third grooves connect the plurality of first grooves and a portion of the plurality of second grooves, and
wherein a separation part formed to have a predetermined length is disposed between one first groove of the plurality of first grooves and another thereof.

2. The motor of claim 1, wherein:
the number of first grooves is an even number; and
the number of second grooves is an odd number.

3. The motor of claim 1, wherein the length of the separation part is smaller than a diameter of the coil.

4. The motor of claim 1, wherein:
the first grooves include a 1-1 groove, a 1-2 groove, a 1-3 groove, and a 1-4 groove;
the second grooves include a 2-1 groove, a 2-2 groove, a 2-3 groove, a 2-4 groove, a 2-5 groove, a 2-6 groove, and a 2-7 groove;
the third grooves include a 3-1 groove, a 3-2 groove, a 3-3 groove, and a 3-4 groove;
the 3-1 groove connects the 1-1 groove and the 2-2 groove;
the 3-2 groove connects the 1-2 groove and the 2-4 groove;
the 3-3 groove connects the 1-3 groove and the 2-6 groove; and
the 3-4 groove connects the 1-4 groove and the 2-7 groove.

5. The motor of claim 4, wherein:
the upper insulator includes an inner guide disposed at an inner side of the upper body and an outer guide disposed at an outer side of the upper body; and
the 3-1 groove, the 3-2 groove, the 3-3 groove, and the 3-4 groove are disposed in order in a direction from the outer guide toward the inner guide.

6. The motor of claim 5, wherein, with respect to a virtual line (L) disposed perpendicular to a radial direction:
the 3-1 groove is formed to have a first inclination angle ($\theta1$);
the 3-2 groove is formed to have a second inclination angle ($\theta2$);
the 3-3 groove is formed to have a third inclination angle ($\theta3$);
the 3-4 groove is formed to have a fourth inclination angle ($\theta4$);
the second inclination angle ($\theta2$) is greater than the first inclination angle ($\theta1$); and
the third inclination angle ($\theta3$) is greater than the second inclination angle ($\theta2$).

7. The motor of claim 6, wherein a separation part formed to have a predetermined length (d) is disposed between the 1-3 groove and the 1-4 groove.

8. The motor of claim 7, wherein the fourth inclination angle ($\theta4$) is smaller than the third inclination angle ($\theta3$).

9. The motor of claim 7, wherein:
winding of the coil starts from the 2-1 groove of the second grooves; and
in a fifth turn, the coil is disposed apart from and faces the separation part in a circumferential direction.

10. The motor of claim 9, wherein, in a sixth turn, the coil is disposed in the 2-5 groove of the second grooves.

11. The motor of claim 10, wherein, in a seventh turn, the coil is disposed in the 2-3 groove of the second grooves.

12. The motor of claim 1, wherein:
a lower body of the lower insulator includes a third side wall portion, a fourth side wall portion disposed apart from the third side wall portion, and a second cover portion extending from an end portion of the third side wall portion and connected to one end portion of the fourth side wall portion;
a plurality of fourth grooves formed in the third side wall portion are disposed to correspond to the first grooves; and
a plurality of fifth grooves formed in the fourth side wall portion are disposed to correspond to the second grooves.

13. The motor of claim 12, wherein:
the second cover portion includes a plurality of sixth grooves; and
the number of sixth grooves is equal to the number of fourth grooves.

14. The motor of claim 13, wherein:
the fourth grooves include a 4-1 groove, a 4-2 groove, a 4-3 groove, and a 4-4 groove;
the fifth grooves include a 5-1 groove, a 5-2 groove, a 5-3 groove, a 5-4 groove, a 5-5 groove, a 5-6 groove, and a 5-7 groove; and
the sixth grooves include a 6-1 groove, a 6-2 groove, a 6-3 groove, and a 6-4 groove.

* * * * *